Oct. 24, 1939.  W. T. MURDEN  2,177,303
ANTIFRICTION BEARING AND METHOD OF MAKING SAME
Filed March 3, 1937

INVENTOR:
WILLIAM T. MURDEN,
BY Gales P. Moore
HIS ATTORNEY

Patented Oct. 24, 1939

2,177,303

UNITED STATES PATENT OFFICE 2,177,303

ANTIFRICTION BEARING AND METHOD OF MAKING SAME

William T. Murden, Bristol, Conn., assignor to General Motors Corporation, Detroit, Mich., a corporation of Delaware Application March 3, 1937, Serial No. 128,821

9 Claims. (Cl. 29—148.4)

This invention relates to antifriction bearings and comprises all of the features of novelty herein disclosed. An object of the invention is to provide an improved bearing adapted more especially for use with a motor vehicle clutch. Another object is to provide a reliable bearing of this type which is less expensive than those heretofore produced by machining a forging.

Figure 1:
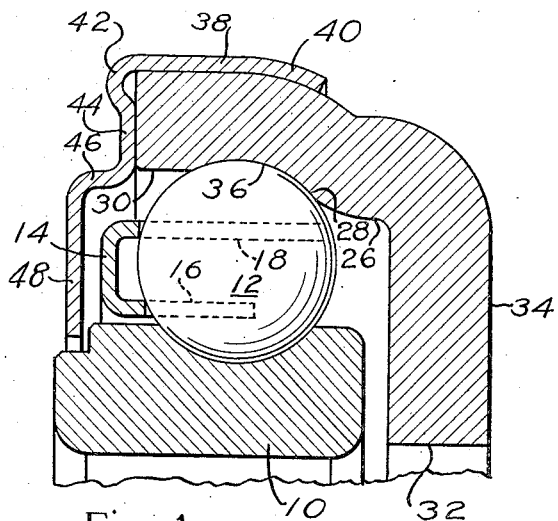

To these ends and also to improve generally upon devices of this character the invention consists in the various matters hereinafter described and claimed. In its broader aspects, the invention is not necessarily limited to the construction selected for illustrative purposes in the accompanying drawing in which:

Fig. 1 is a radial sectional view of a portion of the improved bearing, greatly enlarged.

Figs. 2 to 5, inclusive, are sectional views illustrating steps in the manufacture.

Figure 6:
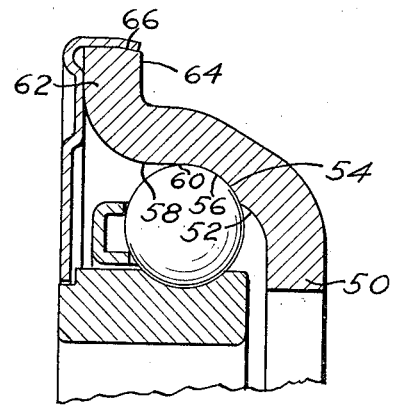
Figure 2:
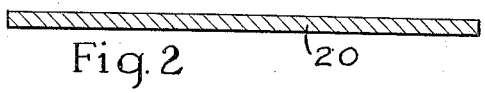

Fig. 6 is a view similar to Fig. 1 of a modification to smaller scale.

The numeral 10 indicates an inner race ring having a raceway for a row of balls 12 which are retained in spaced relation by a retainer comprising a channelled body portion 14, inner spacing fingers 16, and outer spacing fingers 18. The fingers are springy and radially yieldable so that the retainer can be snapped over the balls from one side.

Figure 3:
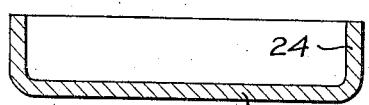
Figure 4:
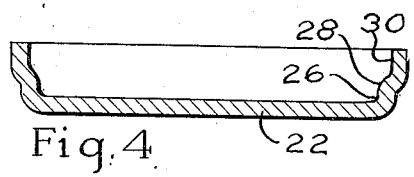
Figure 5:
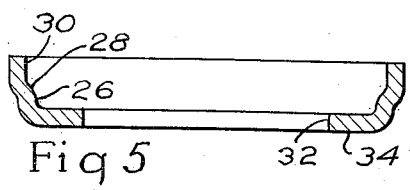

The outer race ring is formed from a sheet metal blank 20 which is first pressed into the form of a cup having a flat bottom 22 and an axial side wall or overhanging flange 24, as indicated in Fig. 3. The cup flange 24 is next expanded to form substantially straight cylindrical portions of different diameter connected by a reverse curve as indicated in Fig. 4, the flange thus becoming stepped. There is a substantially straight but short cylindrical portion 26, a reverse curve providing an internal shoulder 28, and a straight cylindrical terminal portion 30 of larger diameter and greater length than the portion 26. The bottom of the cup is swaged to be smooth and flat and is pierced to form an opening 32 for the resulting flat annular wall 34 which, when the bearing is mounted in connection with an automobile clutch, is adapted to be engaged externally by the usual clutch operating fingers. The inner surface of the wall 34 has clearance with the end face of the inner race ring 10. The opening 32 is slightly larger than the bore of the race ring 10 to clear the slidable sleeve (not shown) upon which the inner race ring is usually press fitted. During the forming operations, the race ring is kept of uniform thickness throughout thus avoiding any necessity for thickening operations. Without any machining operations, it is hardened as by carburizing and given a sand blast finish. It is then ground internally to produce a curved raceway 36 in the region where the shoulder 28 merges with the straight portion 30 which overhangs the balls and holds the bearing assembled. The balls are assembled by the eccentric method and the retainer is snapped on from the side.

A grease retaining shield is secured to the outer race ring. It has a rim 38 fitting the exterior of the terminal portion of the race ring with a terminal holding portion or lip 40 rolled down onto the adjoining reduced portion of the race ring. The rim 38 is connected by a rounded bead 42 to a flat wall 44 which abuts against the end of the race ring, the bead enabling the shield to clear the outer sharp corner of the race ring and any burr which may be left there from the blanking operation. The shield has also a cupped portion formed by a substantially cylindrical wall 46 and a straight wall 48 which enters a notch in the inner race ring.

In a clutch throw-out bearing, the customer's requirements are generally limited to the diameter of the flat face which the clutch operating fingers engage, the bore of the inner race ring and, in a minor way, the width. The outside diameter is not important. In the present bearing, the desired size of the flat face and bore are obtained. The shape of the race ring is such that, without any machining operations as usual with a forging, and by simple pressing operations which keep the metal of uniform thickness, a curved shoulder and an adjoining straight portion are provided into each of which the raceway groove is ground, this providing, with minimum grinding, an ample angular contact surface on one side of the row of balls to take the thrust load and a small overhang on the other side to hold the bearing assembled and prevent injurious axial displacement of the race rings. Thus the cost of forging and machining are avoided without sacrifice of quality.

In Fig. 6, the outer race ring is pressed to form a flange 50, a bend 52 which increases rapidly in diameter, and a shoulder 54. A raceway groove 56 is ground in the shoulder and in the projecting straight portion 58, the groove having its center of curvature near the plane of the ball centers and extending past this plane to the point 60 to overhang the balls and provide a retaining lip. Beyond this point, the metal bends outwardly to form a flange 62 with a flat annular wall 64 adapted to cooperate with a spring washer pertaining to the clutch. Thus there are two oppositely projecting flanges with a stepped or shouldered connecting portion. The flange 62 has its outer end chamfered at 66 to retain the terminal edge of the shield which is similar to that of Fig. 1 but shorter. The ball retainer is wholly contained within the outer race ring without projecting into the cupped part of the shield as in Fig. 1.

I claim:

1. In an antifriction bearing, a pressed sheet metal race ring comprising an annular wall and an axially projecting flange, the wall and the flange being of uniform thickness, the flange having its terminal portion of different diameter both internally and externally than its remaining portion to provide a shoulder, and an angular contact raceway groove formed in the shoulder for running contact with antifriction rolling elements; substantially as described.

2. In an antifriction bearing, a pressed sheet metal race ring comprising an annular wall and an axially projecting flange, the wall and the flange being of uniform thickness, the flange having its terminal portion expanded to a larger diameter both internally and externally than its remaining portion to provide an internal shoulder, and a raceway groove formed partly in the shoulder and partly in said expanded terminal portion; substantially as described.

3. In an antifriction bearing, a pressed sheet metal race ring comprising an annular wall and an axially projecting flange, the wall and the flange being of uniform thickness, the flange comprising two substantially straight portions of different diameters connected by a reversely curved portion, and a raceway groove formed partly in one of the straight portions and partly in the adjoining connecting portion; substantially as described.

4. In an antifriction bearing, a pressed sheet metal race ring comprising an annular wall and an overhanging flange, the wall and the flange being of uniform thickness, the flange comprising two substantially straight portions of different diameters and a connecting bent portion forming a shoulder, and an angular contact raceway groove in the shoulder for running contact with antifriction rolling elements; substantially as described.

5. In an antifriction bearing, a pressed sheet metal race ring comprising a flat annular wall and an overhanging flange, the flange being stepped to provide a curved shoulder between its terminal portion and that portion which joins the flange to the annular wall, and an angular contact raceway groove in the shoulder; substantially as described.

6. In an antifriction bearing, an inner race ring having a raceway, a row of balls engaging the raceway, an outer race ring comprising an annular wall and an overhanging flange, the flange being stepped to provide a curved shoulder between its terminal portion and that portion which joins the flange to the annular wall, and a raceway groove having an angular contact surface in the shoulder and an overhanging surface in the terminal portion; substantially as described.

7. In an antifriction bearing, a pressed sheet metal race ring comprising an inwardly extending flange, an outwardly extending flange, and an intermediate connecting member, the connecting member comprising portions of different diameters both internally and externally to form an internal shoulder therein, and all portions of the race ring being of the same thickness; substantially as described.

8. The method of making a race ring which consists in pressing sheet metal into the form of a ring of angular section and uniform thickness, expanding the terminal portion of the flange to make said terminal portion of larger diameter than the remaining portion of the flange, and grinding a raceway groove at the shoulder formed between the two portions of the flange; substantially as described.

9. The method of making a race ring, which consists in pressing sheet metal into the form of a ring of angular section, expanding the flange to produce two portions of different diameter connected by a reverse curve, the metal being kept at uniform thickness throughout, and grinding a grooved raceway at the curved shoulder formed between said two portions of the flange; substantially as described.

WILLIAM T. MURDEN.